(12) United States Patent
Lyons (10) Patent No.: US 7,854,531 B1
(45) Date of Patent: Dec. 21, 2010

(54) BRIDGE SEAL FOR A WARNING LIGHT ASSEMBLY

(75) Inventor: Jon H Lyons, Haddam, CT (US)

(73) Assignee: Whelen Engineering Company, Inc., Chester, CT (US)

( * ) Notice: Subject to any disclaimer, the term of this patent is extended or adjusted under 35 U.S.C. 154(b) by 351 days.

(21) Appl. No.: 12/006,883

(22) Filed: Jan. 7, 2008

Related U.S. Application Data (63) Continuation-in-part of application No. 11/724,371, filed on Mar. 14, 2007, now abandoned.

(51) Int. Cl.
*F21V 21/00* (2006.01)
(52) U.S. Cl. .............................. 362/217.1; 362/217.01; 362/217.11; 362/217.14; 362/249.01; 362/362
(58) Field of Classification Search ............ 362/217.01, 362/217.1, 217.11–217.17, 225, 227, 249.01, 362/362, 367
See application file for complete search history.

(56) References Cited

U.S. PATENT DOCUMENTS 5,826,965 A * 10/1998 Lyons ........................ 362/477

\* cited by examiner

*Primary Examiner*—Sandra L O'Shea
*Assistant Examiner*—Meghan K Dunwiddie
(74) *Attorney, Agent, or Firm*—Alix, Yale & Ristas, LLP (57) ABSTRACT

The disclosed bridge seal includes a substantially rigid bridge component and flexible gutter seal arranged to span the openings between adjacent housing modules of a modular warning light assembly such as a lightbar. The bridge seal physically connects the adjacent ends of base and dome components to each other and defines a fluid flow channel to guide water away from the area between housing modules. The disclosed bridge seal integrates discrete housing modules into a connected weather resistant enclosure having a longitudinal path for control and power distribution conductors extending the length of the lightbar.

18 Claims, 11 Drawing Sheets

BRIDGE SEAL FOR A WARNING LIGHT ASSEMBLY

CROSS REFERENCE TO RELATED APPLICATIONS

This application is a continuation-in-part of U.S. patent application Ser. No. 11/724,371, filed Mar. 14, 2007 now abandoned, the contents of which are incorporated by reference in their entirety.

FIELD

This disclosure relates generally to a modular warning light assembly for installation on vehicles. In an advantageous embodiment it is more particularly concerned with a weather sealing arrangement for a modular warning light assembly.

BACKGROUND

Warning light assemblies in the form of lightbars mounted to the exterior of a vehicle are well known in the art. Lightbars mounted to the exterior of a vehicle are exposed to the elements, including sunlight, wind, rain, ice, salt, snow, mud and the like. Internal components of the lightbar are susceptible to damage if not protected from exposure to the elements, so lightbars are typically constructed to define a substantially sealed elongated cavity to protect the internal components. Vehicle-mounted lightbars are also exposed to high wind speeds, shock, vibration and temperature extremes which make sealing between housing components problematic.

Lightbars having a single piece dome are relatively easily sealed, but are limited in terms of color combinations and lengths. Prior art lightbars have employed a modular approach where products of different lengths and color combinations are assembled from a unitary base and complementary dome or lens portions joined by sealed dividers. While these assemblies have proven commercially successful, they can be difficult to service and the seals between lens sections are prone to leakage.

There is a need for a modular warning light assembly that permits different product configurations to be assembled from standardized components to provide a substantially sealed elongated cavity.

SUMMARY

According to aspects of the disclosure, a lightbar assembly includes an extruded strength member and a plurality of housing modules arranged on the strength member. The interior of each housing module provides structures for mounting a plurality of outwardly directed lightheads and defines a longitudinal trough in which control electronics and wiring are located. Housing modules include end modules arranged at each longitudinal end of the strength member and center modules positioned between end modules and/or other center modules. End modules are configured so that an inboard end of the longitudinal trough communicates with the adjacent housing module. Center modules are configured so that both ends of the longitudinal trough communicate with adjacent housing modules. This arrangement permits control and power conductors to extend between housing modules to connect components along the length of the lightbar.

Each housing module includes a base and a dome that fit together to define an interior space. The base of each housing module includes an upwardly directed peripheral lip which cooperates with a downwardly directed wall of the associated dome to define a substantially enclosed interior space. At least one longitudinal end of the base and the dome are configured to define an opening communicating between the longitudinal trough of adjacent housing modules.

An aspect of the disclosure relates to components for sealing the longitudinal trough of the lightbar between adjacent housing modules. The disclosed structure includes a substantially rigid bridge component and flexible gutter seal arranged to span the openings between adjacent housing modules, physically connect the adjacent base and dome ends to each other and define a water proof gutter to guide water out of the area between housing modules. The disclosed arrangement integrates otherwise discrete housing modules into a connected, weather resistant enclosure having a longitudinal trough for control and power distribution conductors extending the length of the lightbar.

When the word "about" is used herein it is meant that the amount, dimension or condition it modifies can vary from the stated amount, dimension or condition so long as the advantages of the disclosure are realized. The skilled artisan understands that there is seldom time to fully explore the extent of any area and expects that the disclosed results might extend, at least somewhat, beyond one or more of the disclosed limits. Later, having the benefit of this disclosure and understanding the concept and embodiments disclosed herein, a person of ordinary skill can, without inventive effort, explore beyond the disclosed limits and, when embodiments are found to be without any unexpected characteristics, those embodiments are within the meaning of the term "about" as used herein.

BRIEF DESCRIPTION OF THE DRAWINGS

This disclosure may be better understood by reference to the following description and the accompany drawings in which.

DETAILED DESCRIPTION

The disclosed bridge seal is a sub-assembly that is illustrated in the context of a warning light assembly known in the art as a lightbar. The internal components of the disclosed lightbars are fully described in U.S. patent application Ser. No. 11/724,371, filed Mar. 14, 2007, the contents of which are incorporated by reference in their entirety. Since most of the internal components of the disclosed lightbar are not directly relevant to the disclosed bridge seal, they are omitted from the Figures.

Figure 1:
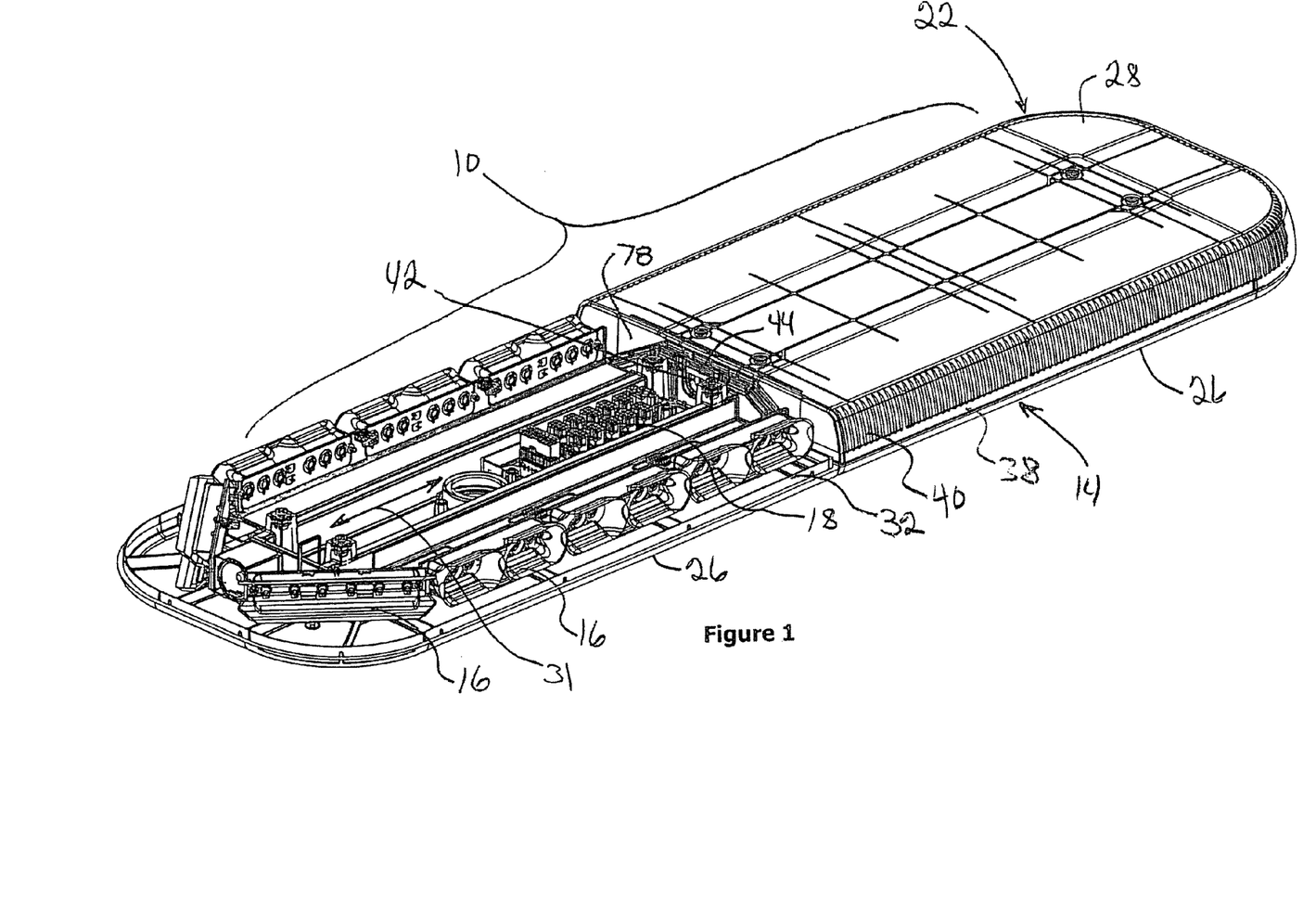
FIG. 1 is a perspective view of one embodiment of a lightbar assembly with one dome removed to show the interior of the lightbar.
Figure 2:
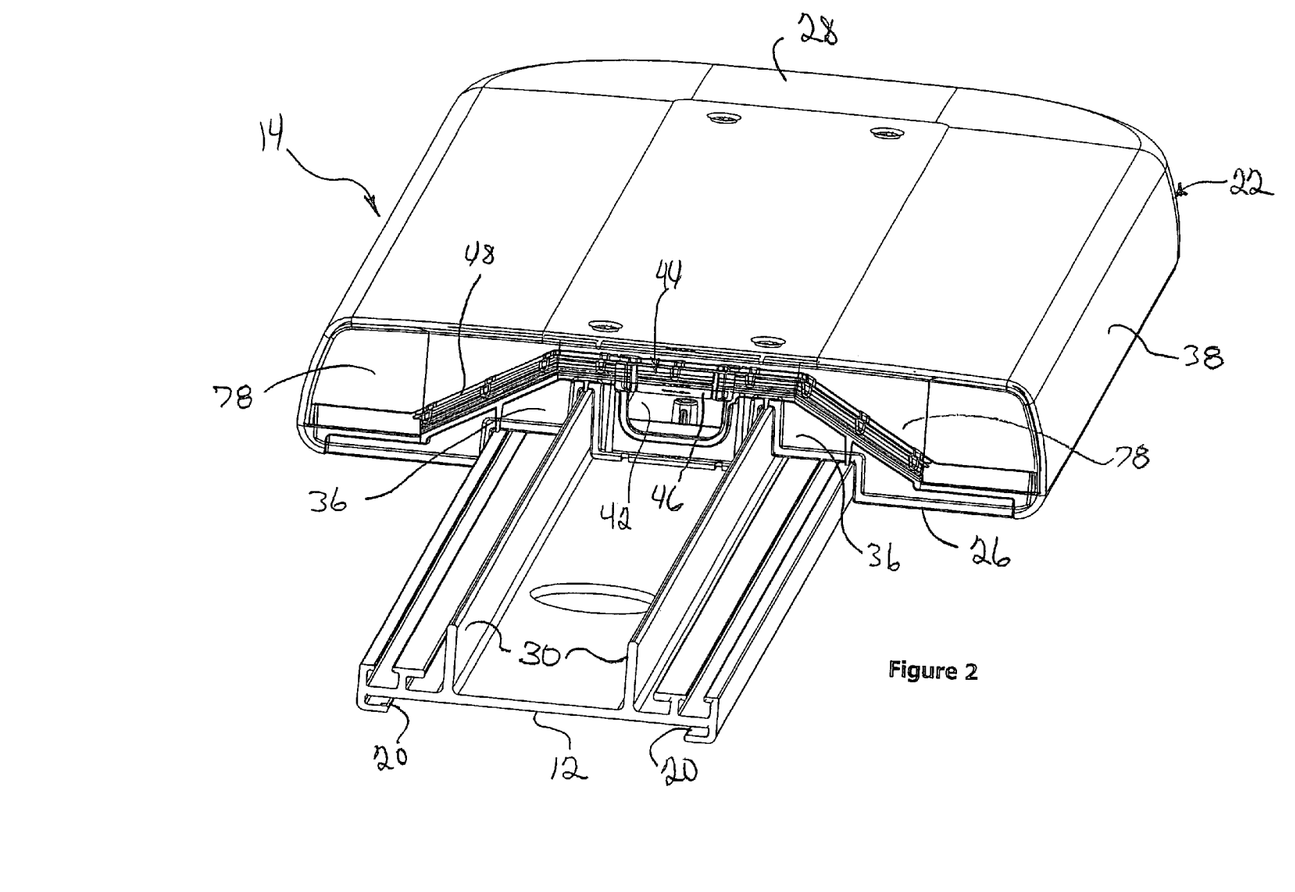
FIG. 2 is a perspective view of the lightbar assembly of FIG. 1 with the base and internal components removed from one end of the lightbar to illustrate the relationship between the strength member and a housing module.

Referring to the embodiments illustrated in the drawings and particularly FIGS. 1 and 2, a lightbar 10 includes a longitudinally extending strength member 12, two or more housing modules 14, lightheads 16, electronics 18 and associated conductors (not shown). The lightbar 10 is typically secured to a vehicle by a mounting foot assembly (not shown) that engages channels 20 on the bottom of the strength member 12 to secure the lightbar 10 to a vehicle in a manner well known in the art. See for example U.S. Pat. No. 6,845,893, the disclosure of which is incorporated herein by reference in its entirety.

Figure 3:
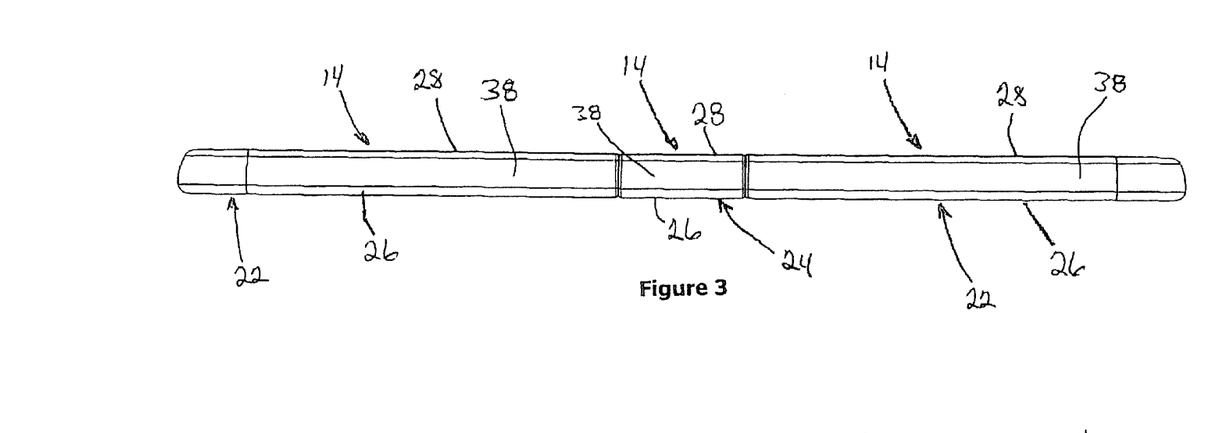
FIG. 3 is a front elevation view of the housing modules of a second embodiment of a lightbar assembly incorporating an embodiment of a bridge seal according to aspects of the disclosure.
Figure 4:
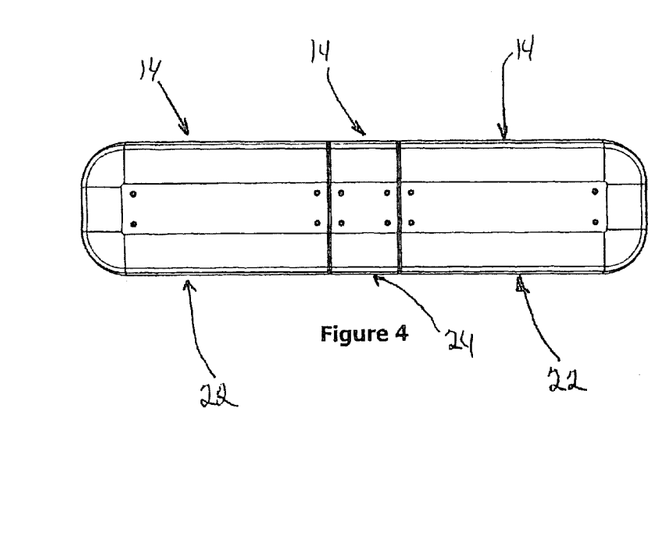
FIG. 4 is a top view of the housing modules of FIG. 3.
Figure 5:
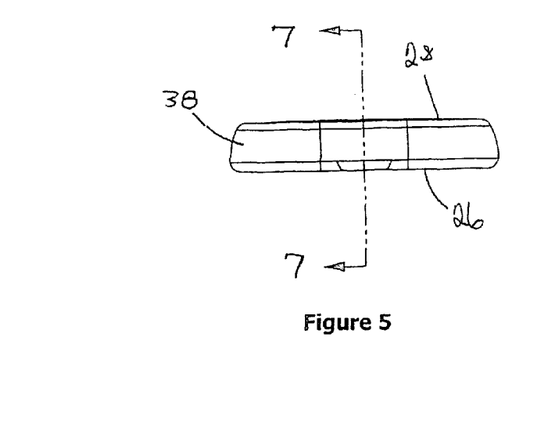
FIG. 5 is an end view of the housing modules of FIGS. 3 and 4.
Figure 6:
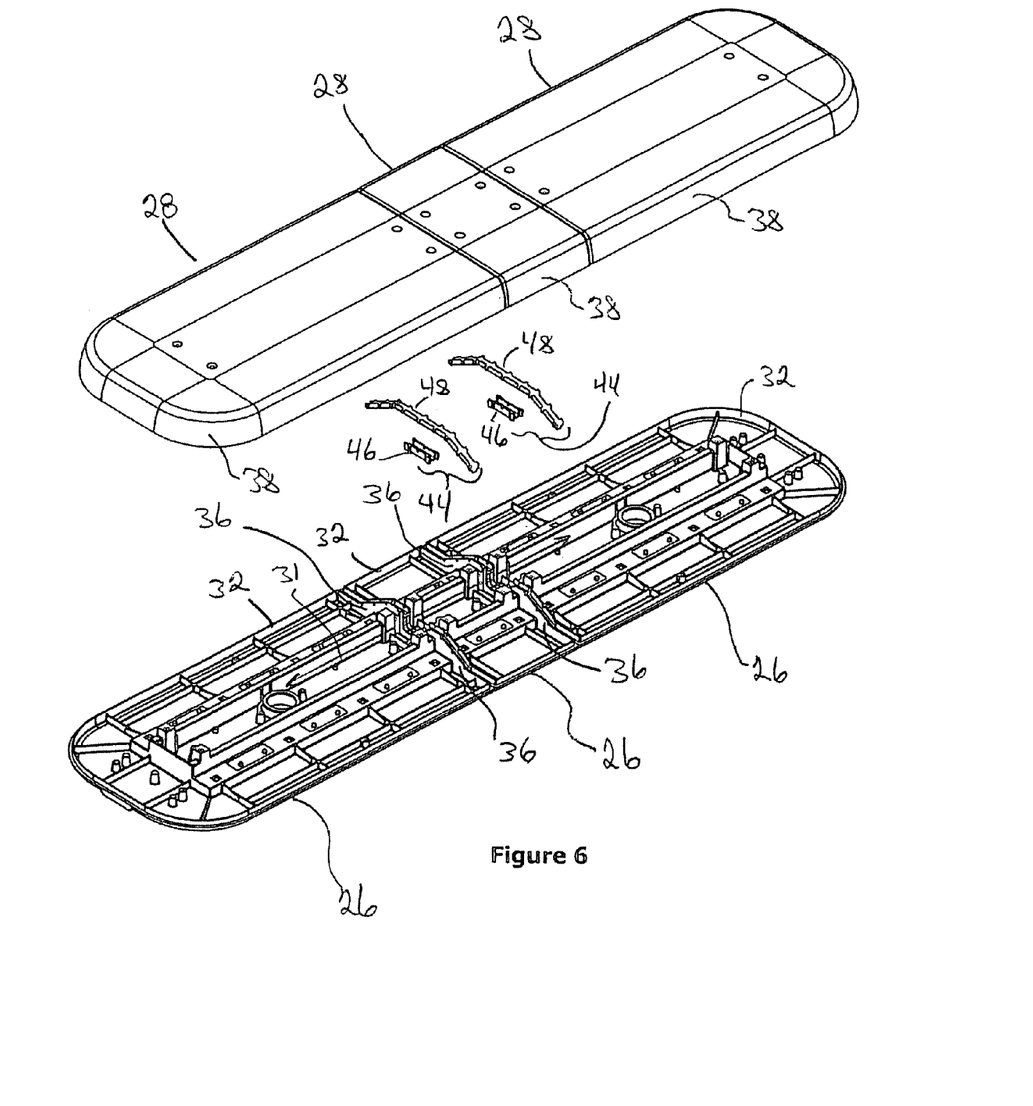
FIG. 6 is an exploded perspective view of the housing modules and bridge seal of FIGS. 3-5.

The exemplary lightbars 10 comprise an elongated strength member 12 which supports a plurality of housing modules 14. The disclosed strength member 12 is an aluminum extrusion, but other suitably rigid components may be compatible with the disclosed lightbars. The length of the strength member 12 and the size and number of housing modules 14 permit construction of many lightbar configurations from a limited number of standardized components. The housing modules 14 include end modules 22 configured to fit over the ends of the strength member 12 and center modules 24 which mount between the end modules 22 as shown in FIGS. 3 and 4. The term "inboard" when used in this application refers to a location between the ends of the lightbar. For example, the inboard end of the end module 22 illustrated in FIGS. 1 and 2 is the end facing the viewer, with the housing module end facing away from the viewer being the "outboard" end.

The lightbar embodiment of FIGS. 1 and 2 includes two end modules 22 and no center module. The lightbar embodiment of FIGS. 3 and 4 includes one center module 24 between the end modules 22. Center modules 24 may be added to extend the length of the lightbar 10 as desired. The disclosed lightbar embodiments include one size of end module 22 and one size of center module 24. It is contemplated that more than one size end module 22 and more than one size center module 24 may be provided to allow a greater variety of lightbar configurations. Generally speaking, the lightbars illustrated and discussed in this application are constructed to be installed in a horizontal orientation with the domes 28 above the bases 26 and the strength member beneath the housing modules 22. References to direction in the specification and claims should be interpreted in view of the described or claimed components as they are positioned in the intended installed orientation.

Each housing module 14 includes a base 26 and a dome 28. As best illustrated in FIG. 2, the underside of each base 26 is configured to receive ribs 30 extending upwardly from the strength member 12. The resulting base configuration defines a longitudinal trough 31 in the center of each base 26. The trough is aligned with the longitudinal axis of the lightbar 10, providing a convenient location for routing power and control conductors and securing control electronics 18, as illustrated in FIG. 1.

Figure 1A:
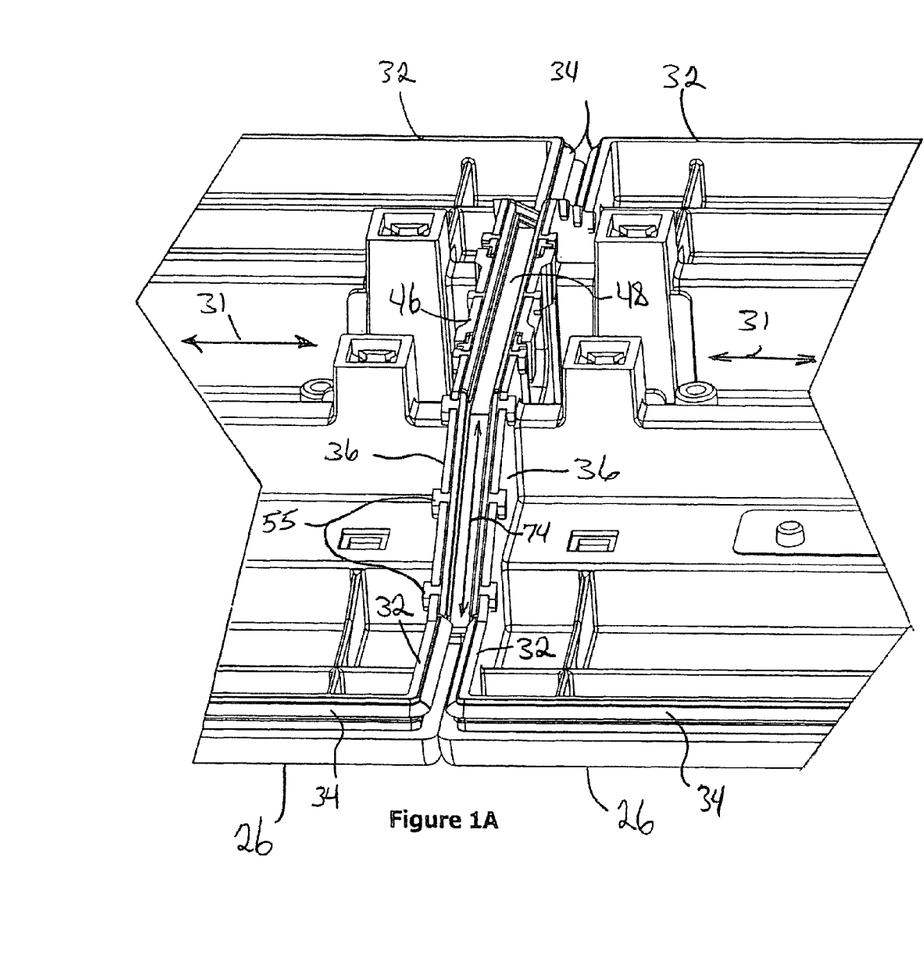
FIG. 1A is an enlarged partial perspective view of the base sections and bridge seal of the lightbar of FIG. 1 with all other components removed.

As best shown in FIG. 1A, each base 26 also includes an upwardly directed peripheral lip 32 provided with a seal 34 on the outside surface of the lip 32. In the disclosed embodiment, the seal 34 is an extruded elastomer, plastic, or rubber seal that is adhesively bonded to the lip 32 of the base 26. In the illustrated embodiments, the lip 32 and seal 34 extend around the periphery of the base 26, except a central portion of the inboard end walls 36 of the base. The seal 34 is configured to be compressed between the lip 32 of the base 26 and the peripheral walls 38 of the dome 28. Other seal configurations may be suitable, such as applying the seal to the dome 28 rather than the base 26. Co-molded seals are also a known equivalent.

The base 26 and dome 28 components are preferably molded plastic parts comprised of a polymeric material, for example polycarbonate. In the disclosed embodiments, the base 26 is opaque plastic while the dome 28 is clear or tinted transparent plastic. The peripheral walls 38 of the domes may include optical features 40 (best seen in FIG. 1) for spreading light generated by lightheads 16 secured within each housing module 14. The peripheral wall 38 of each dome is configured to overlap the upstanding lip 32 of each base and include features to engage the inside surface of the lip 32 to maintain the seal 34 in compressed relationship between the base 26 and dome 28.

As described above, the base 26 and dome 28 of each housing module 14 are configured to define a substantially sealed interior space to protect the internal components of the lightbar 10 from the elements. However, the inboard end wall 36 of each base 26 defines a generally U-shaped opening 42 that allows control and power delivery conductors to connect various internal components distributed among the several housing modules 14. Electronics 18 may be located in the longitudinal trough 31 and conductors for control and power distribution are routed along the longitudinal trough 31 and through the aligned openings 42 in the inboard end walls 36 of adjacent bases 26.

FIG. 1A illustrates the inboard ends of the bases 26 of adjacent housing modules with the domes and other internal components removed for clarity. As shown in FIGS. 1, 1A, 2 and 6 each base 26 includes an inboard end wall 36. In the disclosed embodiment the end walls 36 extend inwardly from the peripheral lip of the base, increasing in height as it progresses toward the longitudinal axis of the lightbar. The center of each end wall 36 defines a U-shaped opening 42 which cooperates with the U-shaped openings 42 of an adjacent base end wall 36 to define a path communicating between adjacent housing modules 14. In the disclosed embodiment, the strengthening ribs 30 of the strength member 12 at least partially enclose the space between adjacent housing modules 14 from below.

The present disclosure relates particularly to a bridge seal 44 configured to traverse the gap between adjacent housing modules at the location of the openings 42 which provide a path connecting adjacent housing modules 14. The disclosed bridge seal 44 includes a bridge 46 and gutter seal 48 configured to span the space between adjacent housing modules 14 to prevent penetration of the elements from above. As best shown in FIGS. 1 and 2, the gutter seal 48 is configured to traverse the highest part of the end walls 36 of adjacent housing modules 14 and extend downwardly and outwardly along the end walls 36 to meet the peripheral lip 32 of the adjacent bases 26. FIG. 2 clearly illustrates the relationship between the upwardly projecting ribs 30 of the strength member 12 and the sloped configuration of the end walls 36 and gutter seal 48. In the disclosed embodiment, the strength member 12 spans the gap between housing modules from below, while the bridge 46 and gutter seal 48 span the gap between adjacent housing modules 14 from above. The bridge seal 44 is configured to guide fluid (water) away from the region between housing modules with the assistance of gravity.

Figure 8:
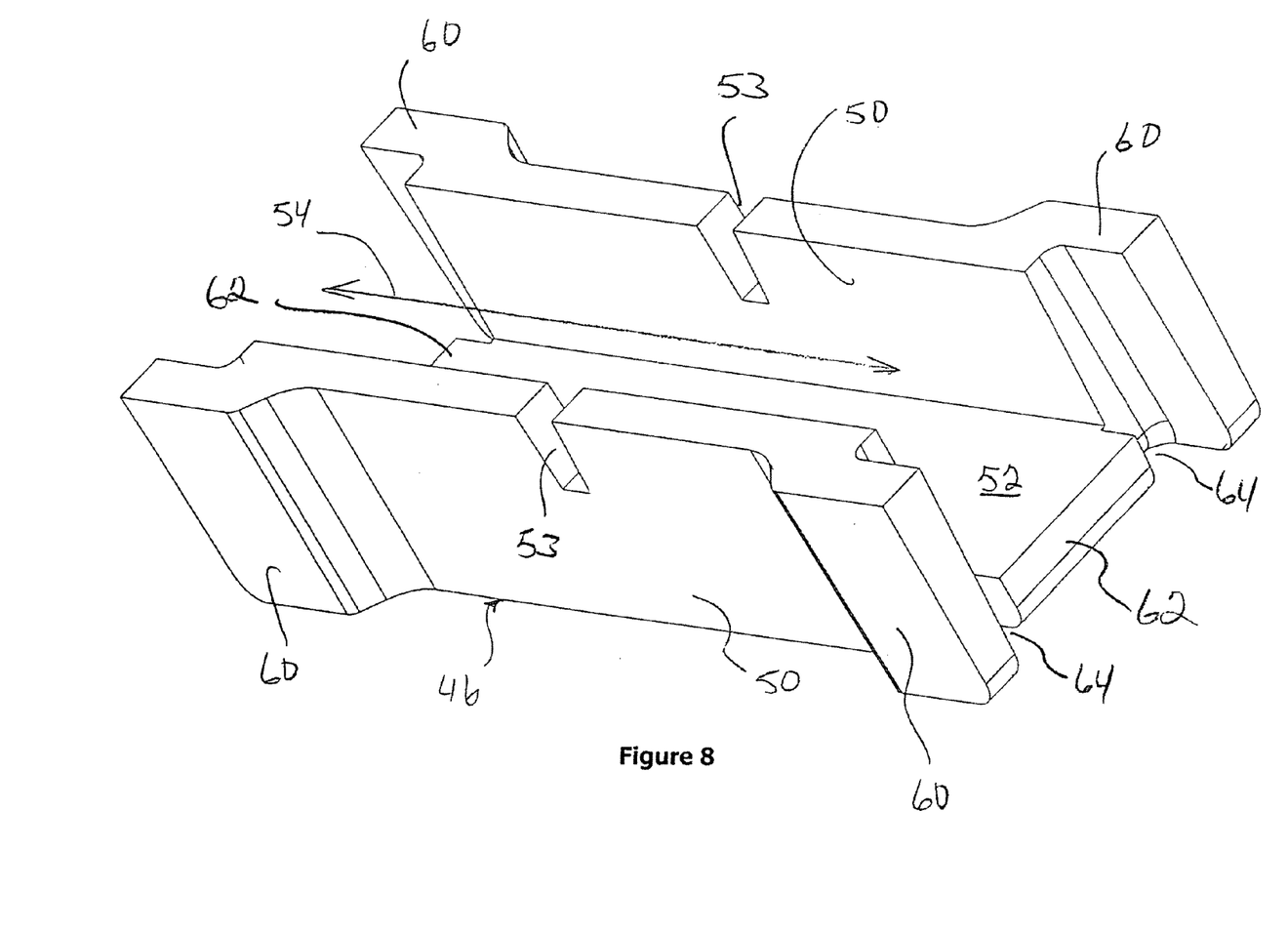
FIG. 8 is an enlarged perspective view of an embodiment of a bridge component according to aspects of the disclosure.
Figure 9:
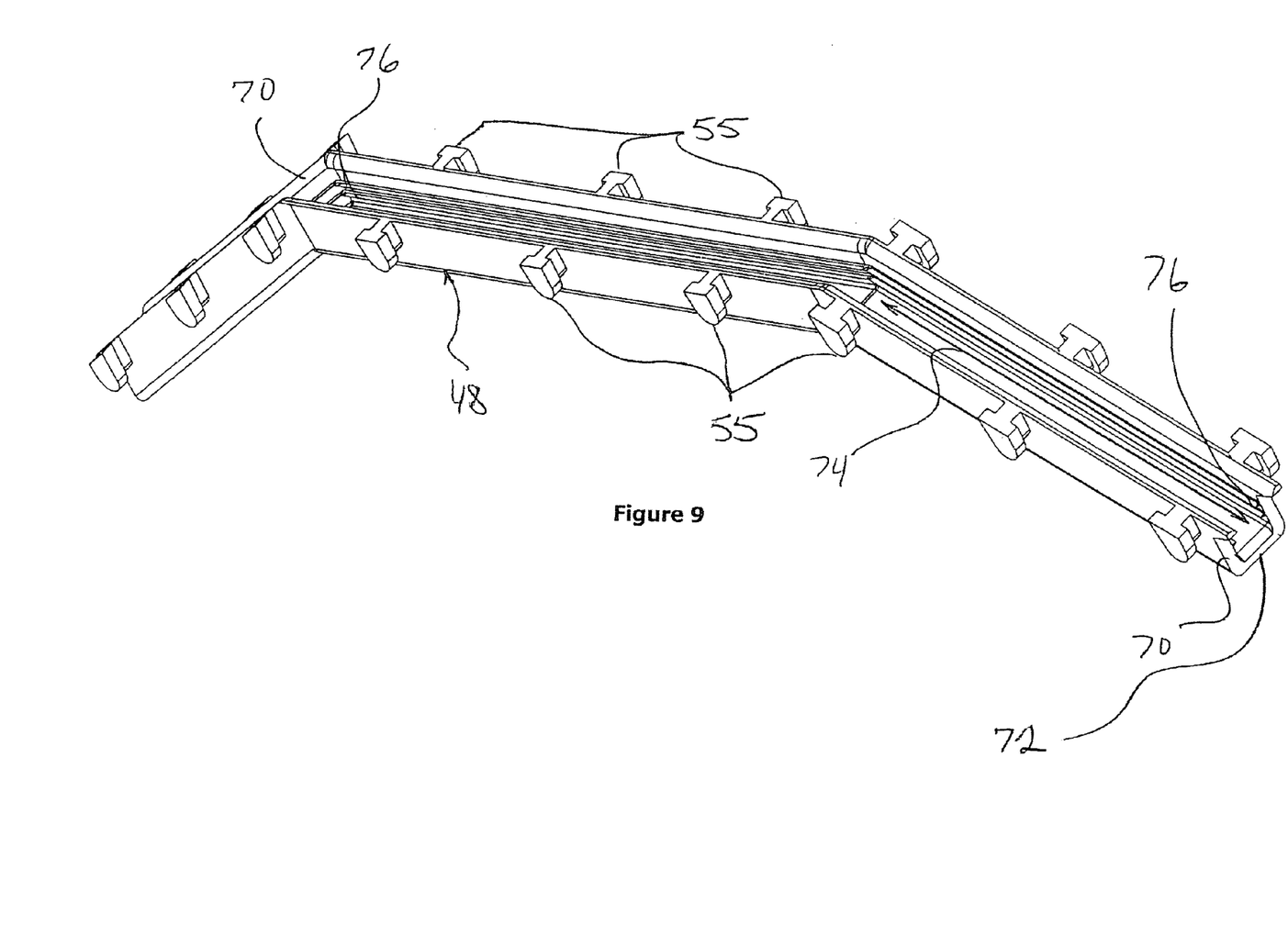
FIG. 9 is an enlarged perspective view of a bridge seal according to aspects of the disclosure.
Figure 10:
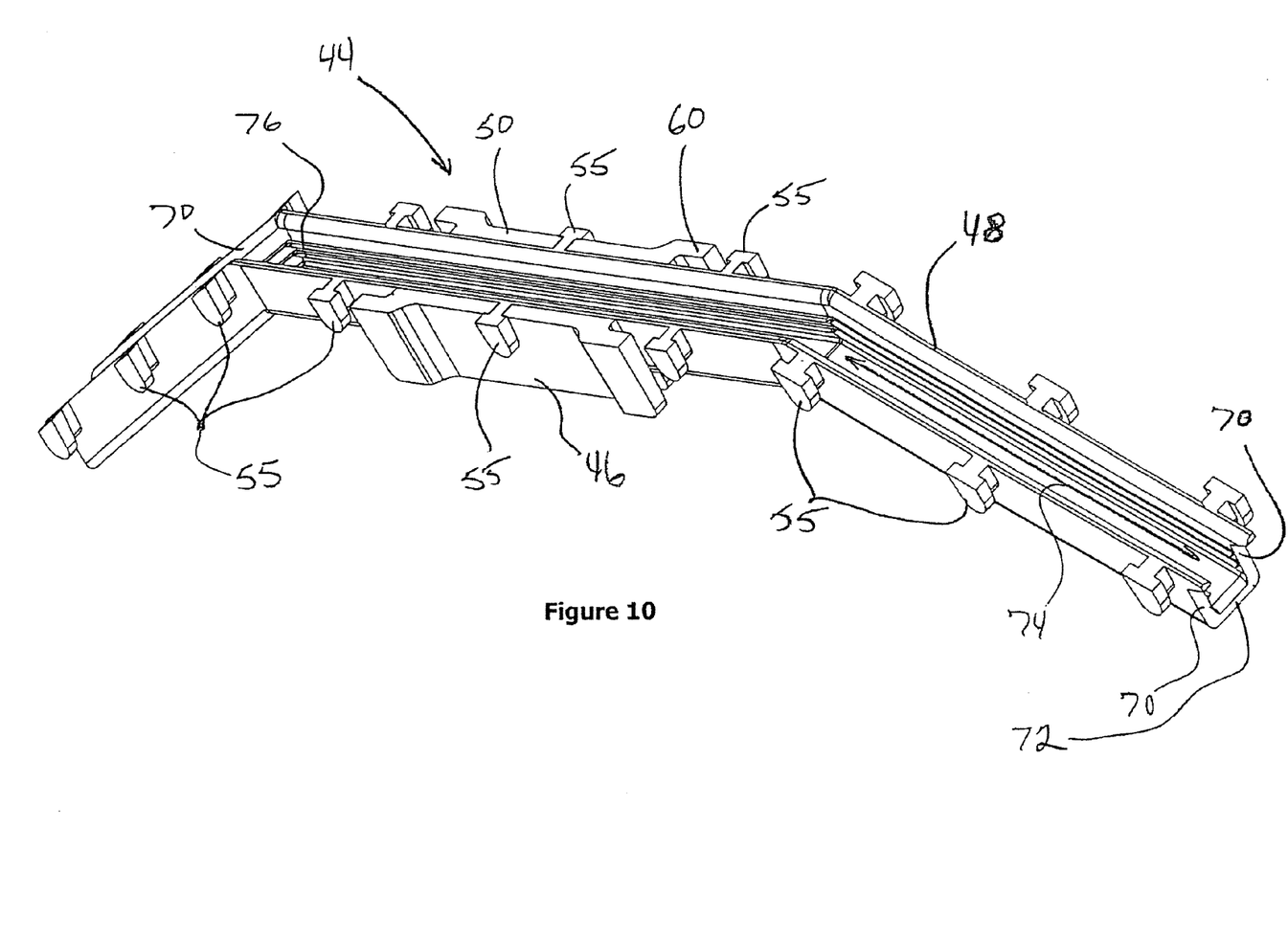
FIG. 10 is an enlarged perspective view of the bridge component of FIG. 8 in functional conjunction with the bridge seal of FIG. 9.
Figure 11:
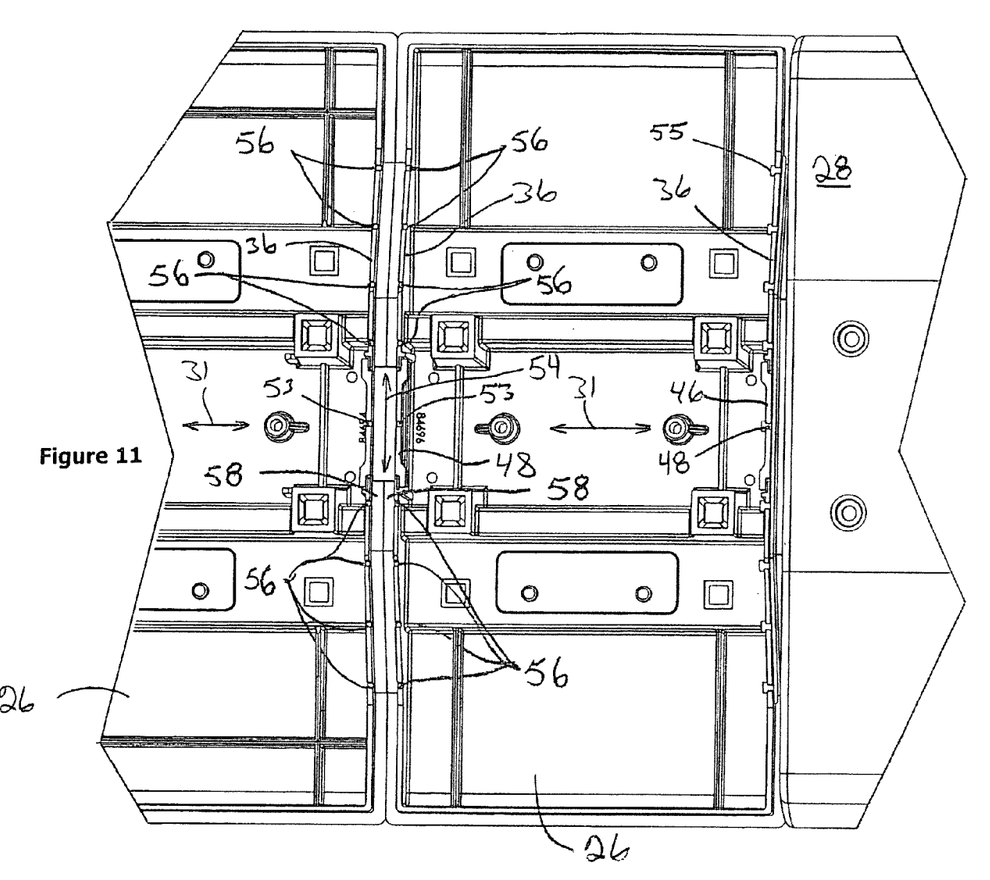
FIG. 11 is an enlarged, partial perspective view of the housing modules of FIGS. 3-7 with the domes of the left end module and center module removed and the left bridge seal removed.
Figure 12:
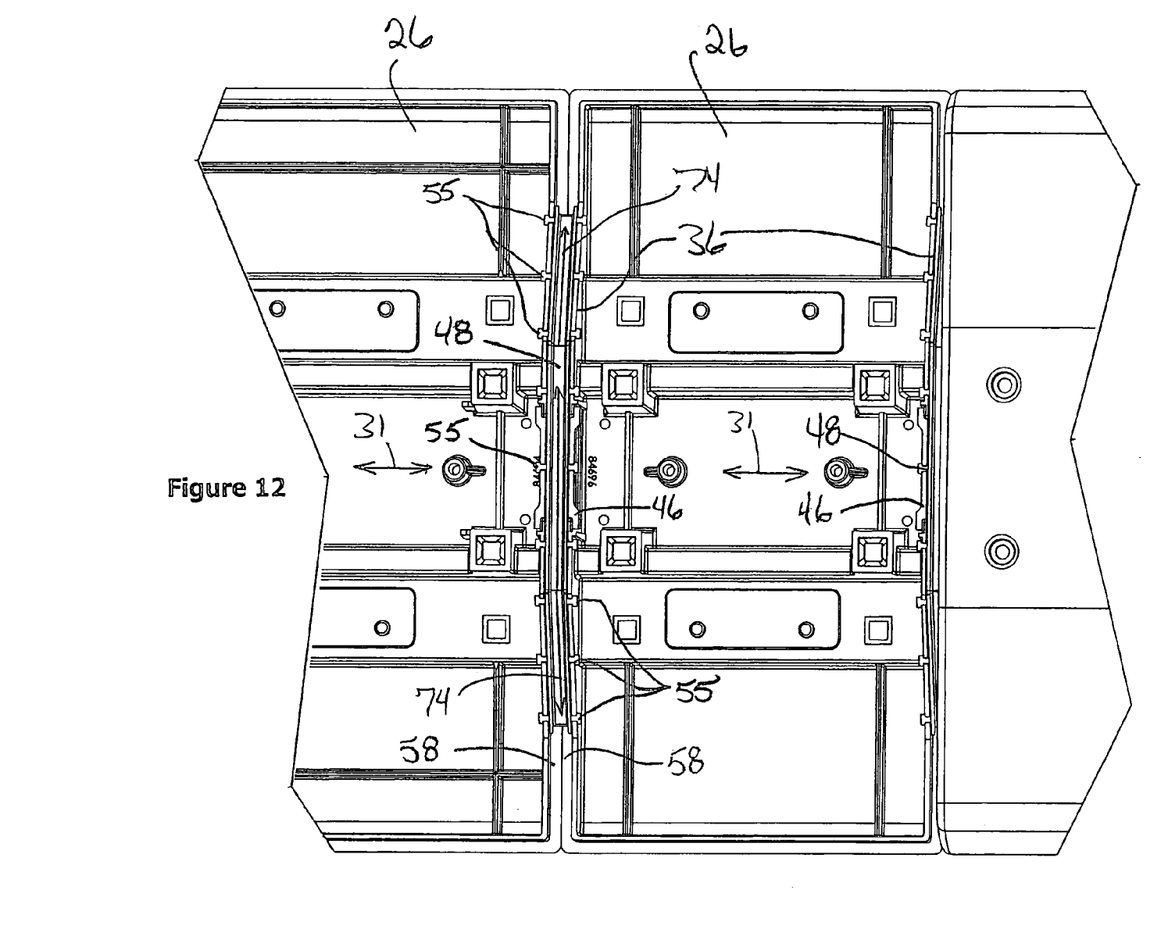
FIG. 12 is an enlarged, partial perspective view of the housing modules of FIG. 11 with the left bridge seal installed.

The illustrated embodiment of a bridge seal 44 includes a bridge 46 and a complementary gutter seal 48 which cooperate to span the openings 42 in the inboard end walls 36 of adjacent bases 26. The bridge 46 and gutter seal 48 components of the disclosed bridge seal 44 are illustrated in FIGS. 8-10. As shown in FIG. 8, the bridge 46 is generally I-shaped and constructed of substantially rigid plastic such as polycarbonate or polystyrene. The bridge 46 includes side walls 50 and a bottom 52 which define a channel 54. Each end of the bridge 46 is configured to provide a mechanical connection between the inboard end walls 36 adjacent bases 26 as shown in FIGS. 1A, 11 and 12. The upper edges of the side walls 50 of the bridge 46 each define a slot 53. These slots 53 are configured to receive and retain ears 55 integrally extending from the gutter seal 48 as shown in FIG. 10.

Figure 7:
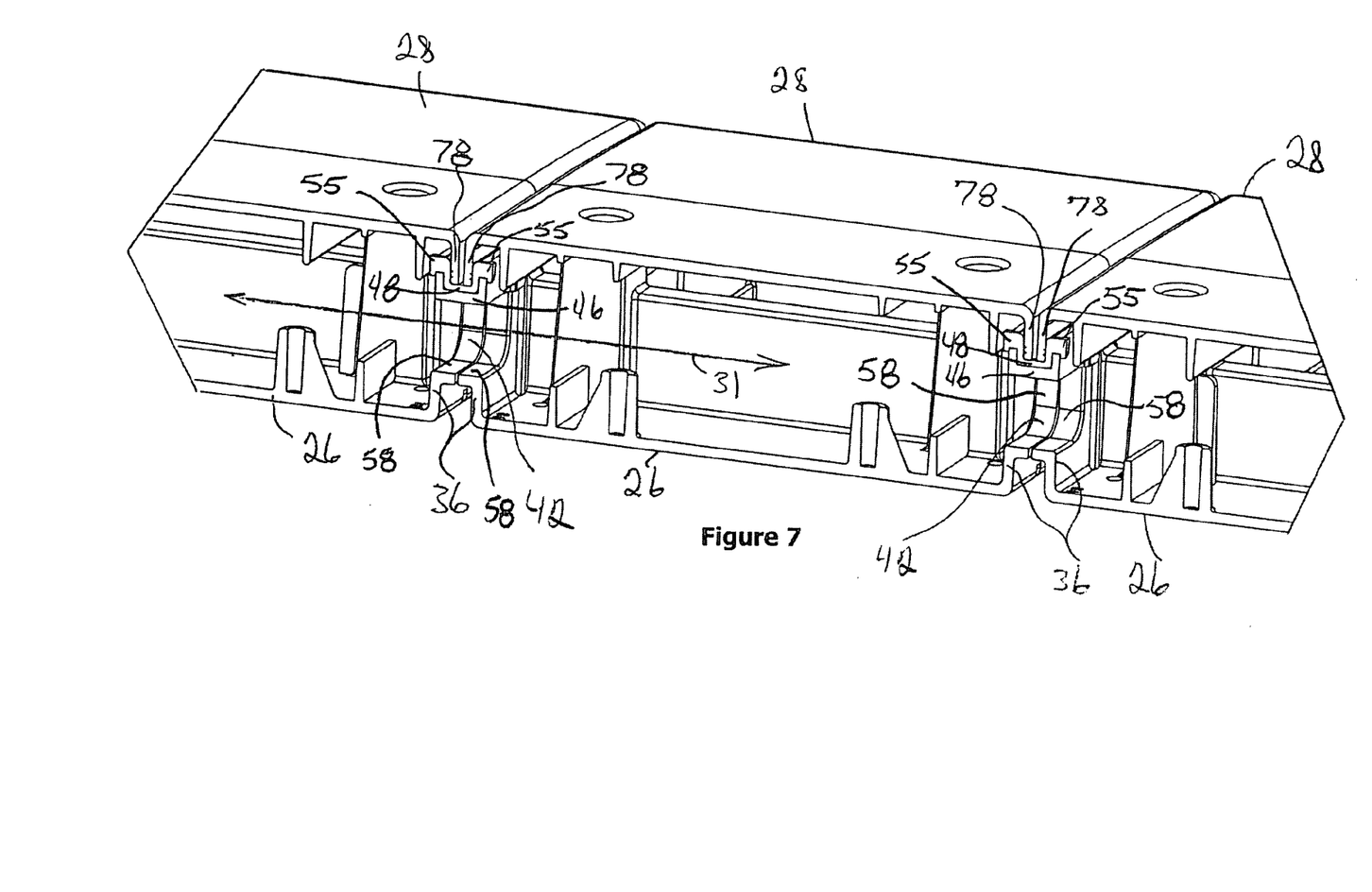
FIG. 7 is an enlarged partial perspective sectional view of the housing modules and bridge seal of FIGS. 3-6, taken along line 7-7 of FIG. 5.

As best illustrated in FIG. 11, the upper portion of each end wall 36 defines a plurality of spaced slots 56 and a ledge 58 generally perpendicular to the vertical orientation of the end wall 36. In the illustrated embodiment, the ledge 58 extends about the entire periphery of the base 26, including the U-shaped opening 42 in the end wall 36 as shown in FIG. 7. The ledges 58 on the inboard ends of adjacent bases 26 abut each other to define the spaced relationship between housing modules 14 as shown in FIGS. 1A, 11 and 12. The slots 56 in the upper edge of the end walls 36 are configured to receive and retain the ears 55 integrally extending from the upper edge of the gutter seal 48. The slots 53, 56 in the upper edges of the bridge 46 and end walls 36, respectively, engage the ears 55 of the gutter seal 48 to provide alignment and mechanical engagement with the gutter seal 48 to retain the otherwise flexible gutter seal 48 in a predetermined position with respect to the bridge 46 and end walls 36 of adjacent bases 26. FIGS. 1A, 2, 7 and 12 illustrate the gutter seal 48 and bridge 46 in their installed positions.

The bridge 46 is configured to span the U-shaped openings 42 in the end walls of adjacent bases 26 and mechanically engage portions of the end walls 36 of adjacent bases 26 as shown in FIG. 11. As shown in greater detail in FIG. 8, the bridge 46 includes spaced walls 50 and a connecting bottom 52 that define a channel 54. An arm 60 extends from the end of each bridge wall 50. Advantageously, each arm 60 is parallel to, and outwardly offset from, each bridge wall 50. A tongue 62 extends from each end of the bridge bottom 52. The tongue 62 and outwardly offset arms 60 define two spaced apart slots 64 which receive portions of the end walls 36 as shown in FIG. 11. When the bridge 46 is disposed between adjacent bases 26, each bridge tongue 62 is supported on a step formed in the adjacent end wall ledges 58 so that the channel 54 in the bridge is aligned with the abutting ledges 58 of the bases 26 to form a location to receive the gutter seal 48.

One embodiment of a gutter seal 48 is shown in FIG. 9. Typically, the gutter seal 48 is molded from an elastomeric polymer. The gutter seal 48 comprises spaced walls 70 and a connecting base 72 that define a gutter channel 74. Ears 55 project outwardly from the wall outside surface at regularly spaced intervals complementary with the slots 53, 56 in the bridge walls 50 and base end walls 36, respectively. The inside surface of the gutter seal walls 70 advantageously comprise one or more inwardly projecting sealing ribs 76. The gutter seal 46 is configured with a central portion and downwardly inclined portions attached to each side of the central portion. This configuration fits the shape of the raised central portion of the base end walls 36, the installed bridge 46 and the sloping portions of the end walls. The gutter seal 48 is received in the channel 54 defined by the bridge 46 and supported by the abutting ledges 58 of adjacent bases 26. The ears 55 projecting from the sides of the gutter seal 48 are received in the slots 53, 56 defined by the bridge walls 50 and end walls 36 respectively.

The inboard end walls 78 of the domes 28 have a configuration complementary to the configuration of the base inboard end walls 36 as shown in FIGS. 1 and 2. The bottom edges of adjacent dome inboard end walls 78 are received in the gutter channel 74 defined by the gutter seal 48 as shown in FIG. 7. The raised central portion of the gutter seal 48 and the downwardly sloped configuration of the inclined portions promote drainage of any water or precipitation away from the openings 42 defined in the end walls of the bases 26.

During assembly, when all the components have been secured within the bases 26 one dome 28 is placed over each base 26 to complete the module 14. The modules 14 are longitudinally arranged end to end relationship. Adjacent dome inboard end walls 78 are retained within the gutter seal channel 74. Thus, the disclosed embodiment provides a continuous gasket interface between the inner surface of the dome peripheral walls 38 and end walls 78 and the outer surface of the base section peripheral lip 32 and end walls 36. Each dome 28 will be secured to the base 26, for example by screws (not shown) passing through the dome 28.

With the above arrangement the interior of the lightbar is sealed from exposure to the elements. However, communication between the base sections in the lightbar is maintained via the aligned openings 42 under the bridge seal 44.

The disclosed bridge seal 44 includes a bridge component 46 described as "rigid" and a gutter seal component described as "flexible." It will be understood that the terms rigid and flexible as used in this application are relative terms and encompass a range of values. It will also be understood that no material is completely rigid and the plastic material of the bridge component 46 is flexible to a limited extent. Further, the bridge seal 44 is disclosed in the form of a two component embodiment. It will be understood that the two components may be combined into a single component or further divided into additional components without departing from the scope of the appended claims.

While preferred embodiments have been shown and described, various modifications and substitutions may be made thereto. Accordingly, it is understood that the present embodiments have been described by way of illustration and not limitation.

What is claimed is:

1. A modular lightbar assembly having a longitudinal axis, said modular lightbar assembly comprising:

two adjacent, longitudinally aligned base sections, each base section having at least one lower end wall defining an aperture, the said at least one lower end walls being in adjacent face-to-face relationship and said apertures generally aligned;

a bridge seal engaged with said adjacent at least one lower end walls, said bridge seal defining a concave channel spanning said apertures and transverse to the longitudinal axis of said modular lightbar assembly;

at least one light generator mounted to one of the base sections; and a dome complementary to each base section, each said dome comprising a peripheral wall having an upper end wall portion received in said channel, wherein each said dome and base interfit to form a module defining an interior space, the interior space of said modules communicating with each other through said apertures beneath said bridge seal.

2. The modular lightbar assembly of claim 1, wherein said bridge seal comprises a substantially rigid bridge configured to form a mechanical connection between the at least one lower end walls.

3. The modular lightbar assembly of claim 1, wherein said bridge seal comprises a flexible gutter seal mechanically engaged with and supported by said at least one lower end walls, said gutter seal defining said concave channel, said concave channel having a sealed bottom spanning said apertures and defining an open top directed away from said apertures, said upper end wall portions being received in the open top of said concave channel.

4. The modular lightbar assembly of claim 1, comprising a longitudinally oriented strength member to which said base sections are attached, said strength member including laterally spaced strengthening ribs projecting toward said base sections and said base sections being shaped to accommodate said strengthening ribs, said base sections defining a longitudinally oriented trough between said strengthening ribs, said apertures communicating with said trough.

5. The modular lightbar assembly of claim 1, wherein said bridge seal includes a central portion spanning said apertures and inclined portions extending from each end of said central portion to channel outlets at either end of said bridge seal, said central portion being elevated with respect to said channel outlets.

6. The modular lightbar assembly of claim 1, wherein each said at least one lower end wall includes an upper edge defining a plurality of slots and said bridge seal includes a plurality of ears complementary to said slots, said ears are received in said slots forming a mechanical connection between said bridge seal and the said at least one lower end walls of adjacent base sections.

7. The modular lightbar assembly of claim 1, wherein said base sections include inboard ends having peripherally projecting ledges, the ledges of adjacent base sections abutting each other, said ledges and said at least one lower end walls defining a support channel, said bridge seal received in said support channel and spanning said abutting ledges in a longitudinal direction.

8. The modular lightbar assembly of claim 1, wherein each said apertures are generally U-shaped and define an opening facing said dome, said bridge seal configured to span the apertures of adjacent base sections in a direction transverse to said longitudinal axis.

9. The modular lightbar assembly of claim 1, wherein each said at least one lower end wall includes wall segments laterally separated by said apertures, said segments having a height which decreases as the segments progress laterally away from said apertures, said bridge seal having a central segment spanning said apertures and inclined segments extending from either end of said central segment, said inclined segments having a configuration complementary to said wall segments.

10. A bridge seal for use with adjacent warning light modules, each said warning light module comprising:

a base having at least one lower end wall defining an aperture configured to align with the aperture defined by the at least one lower end wall of an adjacent warning light module;

at least one warning light mounted to said base;

a dome configured to mate with said base to define an interior space containing said at least one warning light, said dome including at least one upper end wall portion spanning said aperture, said bridge seal comprising:

a bridge spanning the apertures of adjacent bases and engaged with the at least one lower end wall of adjacent bases; and a gutter at least partially supported by said bridge, said gutter defining a fluid flow channel traversing the apertures of adjacent bases, said fluid flow channel having a length greater than said bridge and configured to receive the at least one upper end wall portions of adjacent domes when said domes are mated with their respective bases.

11. The bridge seal of claim 10, wherein said bridge is a substantially rigid component configured to mechanically engage the at least one lower end walls of adjacent bases.

12. The bridge seal of claim 10, wherein said gutter is molded from elastomeric material and configured to sealingly engage the at least one upper end wall portions of adjacent domes.

13. The bridge seal of claim 10, wherein said gutter includes a central section spanning said bridge and inclined sections extending from either end of said central section, said fluid flow channel configured to direct fluid in said channel away from said apertures with the assistance of gravity.

14. The bridge seal of claim 10, wherein said gutter comprises inclined segments joined by an intermediate segment, each segment comprising spaced walls connected to a base, the walls and base in each segment defining said fluid flow channel, said spaced walls having inside surfaces including sealing features arranged to engage the at least one upper end wall portions of adjacent domes received therein.

15. The bridge seal of claim 10, wherein said gutter is connected to said at least one lower end walls of adjacent bases in a predetermined location with respect thereto.

16. The bridge seal of claim 10, wherein said bridge and said gutter are separable components.

17. The bridge seal of claim 10, wherein said gutter and said at least one lower end walls are configured form a separable, mechanical connection maintaining said gutter in a predetermined position with respect to the said at least one lower end walls of adjacent bases.

18. The bridge seal of claim 10, wherein each said at least one lower end wall includes wall segments laterally separated by said apertures, said segments having a height which decreases as the segments progress laterally away from said apertures, said gutter having a central segment spanning said apertures and inclined segments extending from either end of said central segment, said inclined segments having a configuration complementary to said wall segments.

* * * * *